L. R. COLE.
REGISTER FOR PUMPS.
APPLICATION FILED FEB. 8, 1911.

1,048,041.

Patented Dec. 24, 1912.
4 SHEETS—SHEET 2.

Witnesses:
A. N. Jesbera
W. F. Whittaker

Inventor
Louis Randolph Cole,
By his Attorneys
Redding Greeley Austin

L. R. COLE.
REGISTER FOR PUMPS.
APPLICATION FILED FEB. 8, 1911.
1,048,041.
Patented Dec. 24, 1912.
4 SHEETS—SHEET 3.
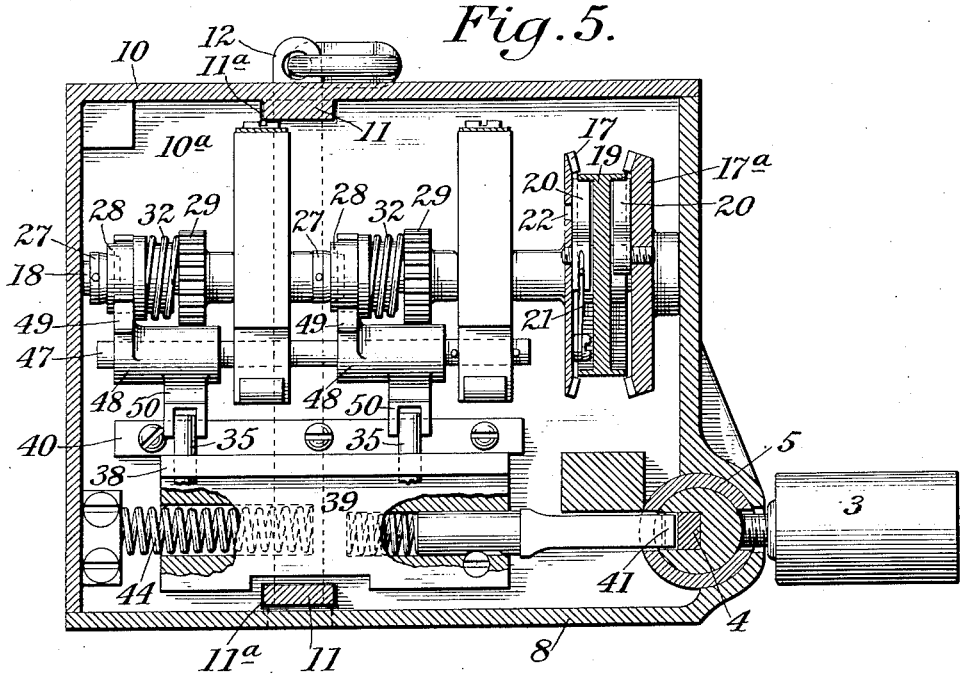
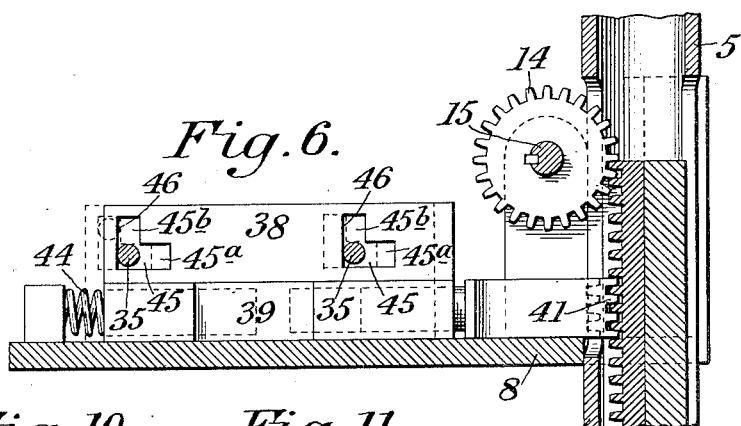
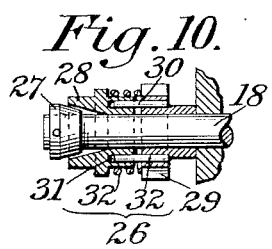
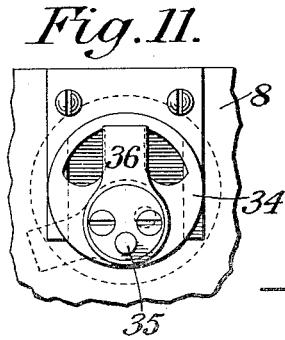
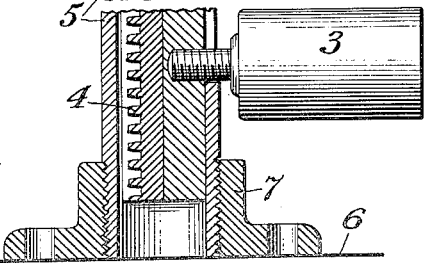
Witnesses:
A. N. Jesbera.
W. F. Whittaker.
Inventor
Louis Randolph Cole
By his Attorneys
Redding Greeley Austin

L. R. COLE.
REGISTER FOR PUMPS.
APPLICATION FILED FEB. 8, 1911.

1,048,041.

Patented Dec. 24, 1912.
4 SHEETS—SHEET 4.

Witnesses:
A. N. Jesbera
W. F. Whittaker

Inventor
Louis Randolph Cole
By his Attorneys

UNITED STATES PATENT OFFICE.

LOUIS RANDOLPH COLE, OF NEW YORK, N. Y.

REGISTER FOR PUMPS.

1,048,041.  Specification of Letters Patent.  Patented Dec. 24, 1912.

Application filed February 8, 1911. Serial No. 607,413.

*To all whom it may concern:*

Be it known that I, LOUIS RANDOLPH COLE, a citizen of the United States, residing in the borough of Brooklyn of the city of New York, in the State of New York, have invented certain new and useful Improvements in Registers for Pumps, of which the following is a specification, reference being had to the accompanying drawings, forming a part hereof.

The invention relates to means for registering the operation of a moving part or mechanism such as the rod or plunger of a pump, and one of the objects of the invention is to provide means whereby both the moving part and the registering mechanism may be held against operation except under predetermined conditions.

A further object of the invention is to provide means whereby the locking and registering mechanism may be released by a plurality of independent locks.

Another object of the invention is to provide means whereby the registering mechanism shall be operated at every movement or stroke of the moving part or shall be operated only at each alternate movement or stroke as desired.

The various other objects of the invention will be more fully set forth in the following descriptions of one form of mechanism and certain illustrative modifications thereof, embodying my invention, which consists in the new and novel features of construction and combinations of parts hereinafter set forth.

Figure 1:
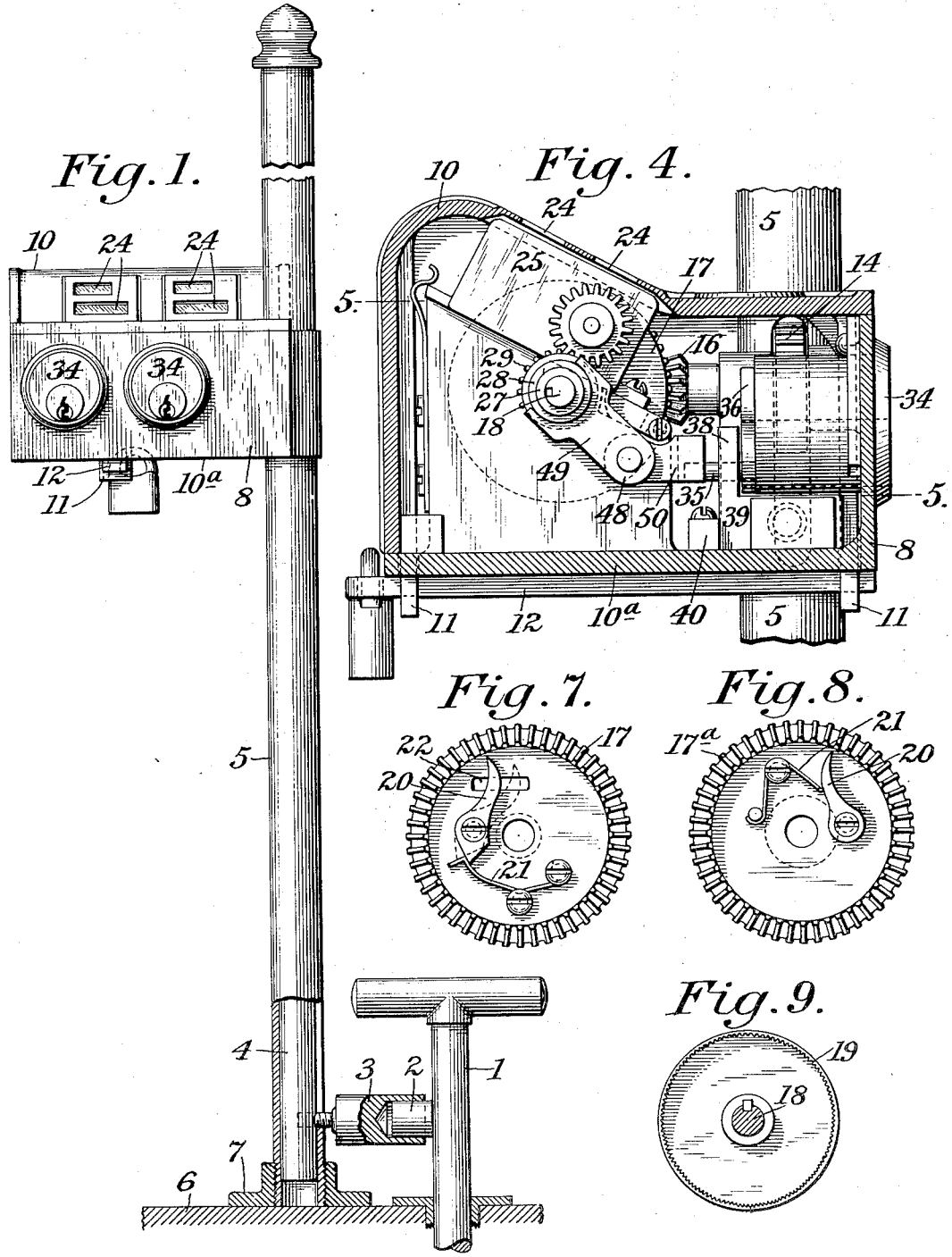
Figure 2:
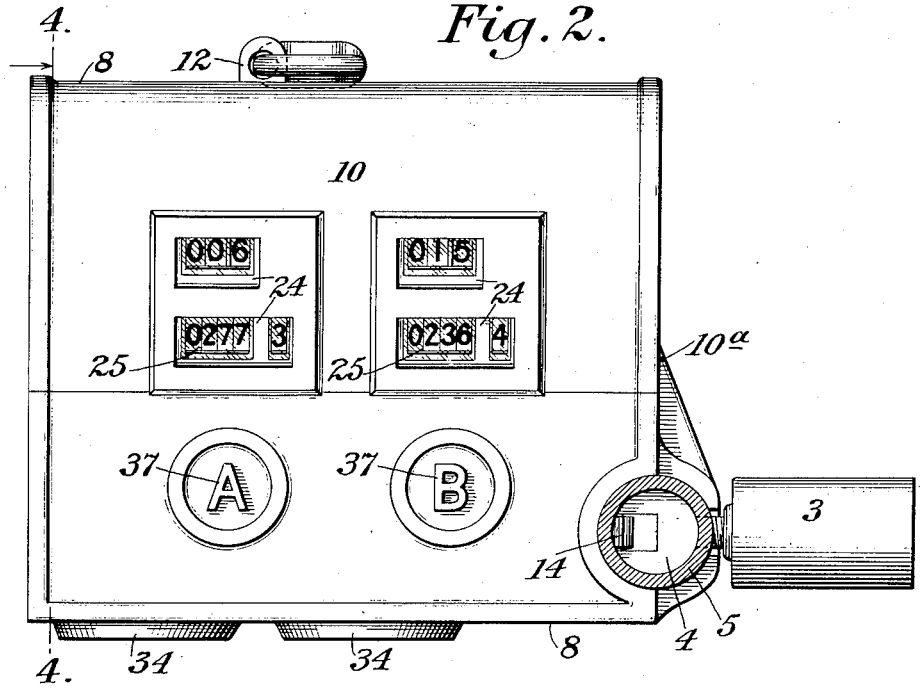
Figure 3:
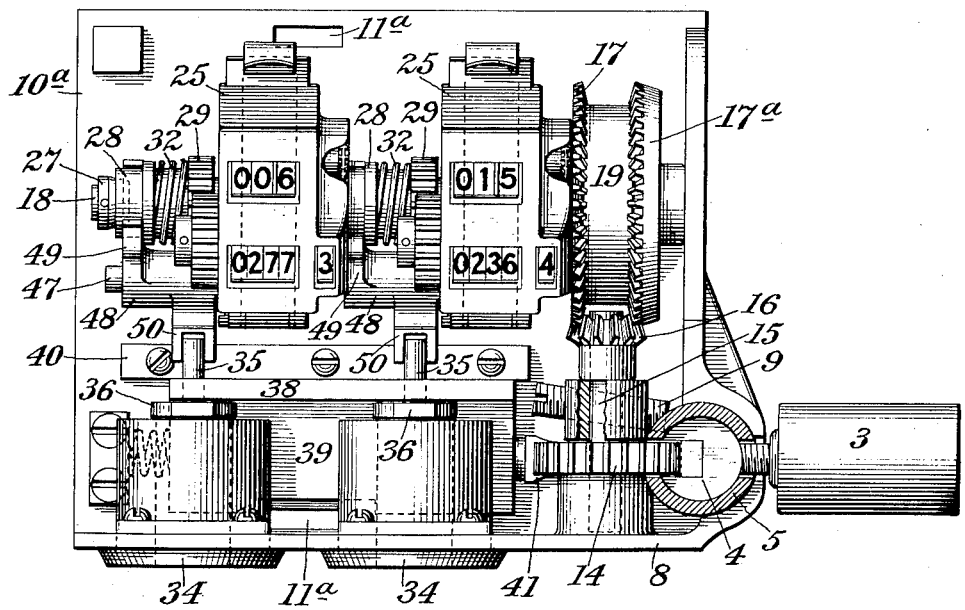
Figure 12:
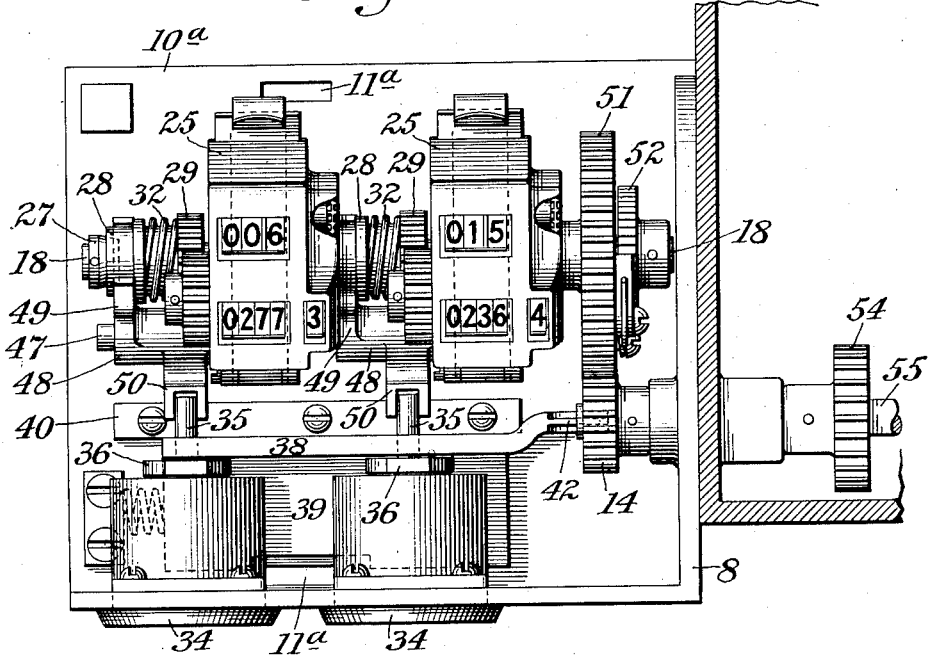
Figure 13:
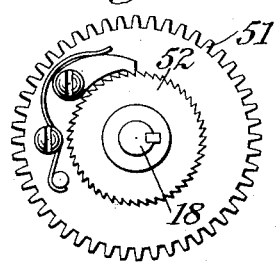
Figure 15:
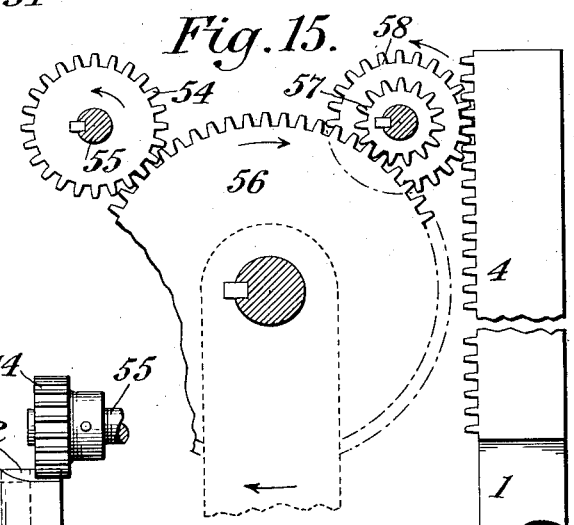
Figure 14:
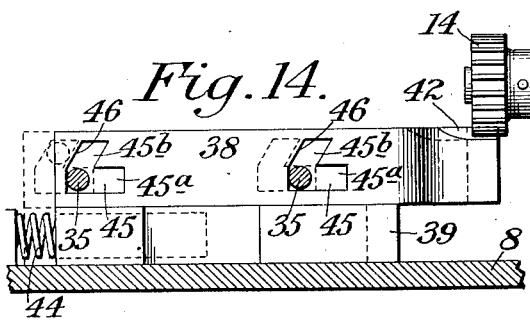

In the accompanying drawings—Figure 1 is a front elevation of my improved mechanism as applied to and operated by the rod or plunger of a pump (not shown). Fig. 2 is a plan view of the casing containing the registering and locking mechanism, the supporting standard being shown in section. Fig. 3 represents a corresponding view with the cover removed. Fig. 4 represents an end view with the casing in section on the lines 4—4 of Fig. 2. Fig. 5 represents a horizontal section on the lines 5—5 of Fig. 4. Fig. 6 is detail view showing the construction of the locking bar and the rack. Figs. 7, 8 and 9 are detail views showing the construction of the several parts of the clutch mechanism for operating the driving shaft of the registering devices. Fig. 10 is a detail view of one of the clutch mechanisms between the driving shaft and one of the registering devices. Fig. 11 represents an end view of the barrel of the lock. Fig. 12 represents a modified construction adapted to register only movement in one direction of the actuating rack. Fig. 13 is a detail view of the clutch mechanism shown in Fig. 12. Fig. 14 represents a side elevation of a modified form of locking bar. Fig. 15 is a diagrammatic view showing actuating rack integral with the pump plunger or other moving part.

Referring to the particular device embodying my invention shown in the accompanying drawings, the registering mechanism is operated by and registers the extent of movement of any moving part as the rod or plunger 1 of a pump (not shown) which performs a definite amount of work, such as supplying a certain quantity of liquid by a predetermined movement or stroke. The rod or plunger may be securely connected by any suitable means as a stud 2 to the movable member 3 having a rack 4 secured thereto or formed integral therewith. The rack is movable in and guided by a hollow standard 5 which may be secured to any suitable support as the floor or table 6 by a base plate 7.

The registering and locking mechanism is contained in a casing 8 secured to the standard by any suitable means as the screw or bolt 9. The casing is preferably made in two parts 10 and 10ª which may be secured together by a lug 11 formed integral with one part and passing through an eye 11ª provided in the other part and engaged by a bar 12 which may be locked against removal in any well known manner. Within the casing a pinion 14 keyed to a transverse shaft 15 is constantly in mesh with the rack, and preferably a bevel gear 16 is secured to said shaft which is constantly in mesh with gear wheels 17 and 17ª loosely mounted upon the driving shaft 18 of the registering devices. A ratchet disk 19 is keyed to the shaft 18 between the gears which are adapted to engage with said disk when rotated in opposite directions by means of pawls 20 which are normally held in engagement with the teeth on the disk by means of springs 21, so that the pawl of one gear will ride idly when the pawl on the other gear is in operative engagement with the disk. A slot 22 is provided in one of the gears so that access may be had to one of the pawls which can be permanently disconnected from the disk if desired. Suitable sight openings 24 are provided in the casing to permit inspection of the dials of the registering devices.

A plurality of registering devices 25, which may be of any preferred or well known construction, are mounted in the casing 8. Said devices are driven from the shaft 18 through a corresponding number of clutch mechanisms 26, each of which comprises a clutch member 27 keyed to the shaft and a female member 28 loosely mounted on the shaft and operatively engaged with the driving gear 29 of the corresponding registering device by suitable means as a pin 30 in the one part which seats in a socket 31 in the other part and thus permits movement of the female clutch member with relation both to the male member of the clutch and to the gear. A spring 32 normally holds the clutch members in engagement.

A plurality of locks 34 corresponding in number and position with the registering devices are mounted in the casing and are arranged in a row parallel with the registering devices and a suitable distance therefrom. Each lock is operated by a key in the usual manner and preferably the locks are of a type requiring individual keys so that it will be impossible to operate any lock except with the particular key fitted thereto. The locks comprise a barrel, tumblers, pin 35 and guard 36 which may be of any well known construction. If desired a letter 37 or other indicia may be placed on the casing contiguous to each lock so that the same may be designated.

A locking bar 38 is arranged between the locks and the registering devices and is guided in any suitable manner as by an integral flange 39 sliding on the casing and held against lateral displacement by guide 40. At its forward end the bar is provided with teeth 41 adapted to engage the rack or with a jaw 42 (Figs. 12 and 14) adapted to engage the pinion 14. A spring 44 engages with the bar and normally holds the same in its locking position. An irregular shaped opening or slot 45 is provided in the bar opposite each lock and the pin 35 projects therethrough. Each slot comprises a longitudinal portion 45$^a$ and a vertical or inclined portion 45$^b$, one side of which, as 46, is adapted to engage with the pin 35. The guard 36 preferably engages with the guiding flange 39 when the locking bar has reached its retracted position and prevents further rotation of the lock barrel and also assists the pin 35 in holding the bar in its retracted position.

An auxiliary bearing shaft 47 is secured in the casing parallel to the shaft 18 and has a plurality of sleeves 48 movably mounted thereon between the registering devices and the locks and corresponding in number and position therewith. Oppositely projecting arms are formed integral with each sleeve, one of said arms as 49 loosely contacting with the movable clutch member of one of the registering devices and the other arm as 50 being secured to the pin of the corresponding locking device. Consequently the movable clutch member will be disengaged positively when the locking bar is thrown into its forward or locking position by the rotation of the pin and will be released when the locking bar is retracted by the pin, thus permitting the spring 32 to bring the clutch members into engagement.

As shown in Fig. 12 of the drawings the registering devices may be operated from the pinion 14 through a gear 51 operatively connected with the shaft 18 by pawl and ratchet 52 so that the registering device will be actuated only upon alternate strokes of the operating handle. In this construction the rack does not engage directly with the pinion 14 but engages intermediately with the pinion 54 mounted upon a shaft 55 parallel to the shaft 18 and having suitable bearings in the casing 8. As indicated in Fig. 15, the connection can be made between the rack and gear 54 through the train of gears 56, 57 and 58. In this case the rack may be formed upon and integral with the moving part such as the pump plunger 1.

When the lock is closed or in its locked position, not only is the actuating or moving member such as the pump plunger held against movement but the registering devices also are disconnected from their driving shaft. When any one of the plurality of locks is opened, however, the pin 35 acting against the side 46 of the adjacent slot 45 in the locking bar retracts said bar against the tension of the spring 44 and simultaneously releases the clutch member of the corresponding registering device, thus permitting the spring 32 to bring the clutch members into engagement. The construction of the slots is such that the bar will be retracted by rotation of the pin 35 secured to any one of the locks since the horizontal slot member permits independent movement of the locking bar with relation to the remainder of the pins. Any movement of the moving part such as the pump plunger after the locking bar has been retracted will be indicated and recorded upon the registering device. In the construction shown in Figs. 12 and 15 only the alternate strokes or movements of the moving member will be recorded, but in the construction shown in Fig. 3 each movement of the moving member will be recorded on the registering device unless one of the pawls 20 is disconnected by a suitable instrument inserted through the slot 22 whereupon the said construction likewise will record only the alternate movements of the moving part. When the lock key is again turned to its starting position, the clutch member 28 is positively disengaged and the locking bar is released by the pin 35, thus permitting the spring 44 to force the locking bar into engagement with the moving part and hold the same against further movement.

By means of this construction an accurate record may be kept of the work as determined by the number of movements of the moving part which is performed by each salesman or foreman intrusted with a key to one of the locks. In case the keys are given to the managers and foremen of different departments of the same factory or establishment where this apparatus may be used, a record will be kept of the article dispensed or controlled by the moving part used by each particular department.

Although the apparatus has been shown and described as being attached to the rod or plunger of a pump it is evident that the apparatus may be used for a great number and variety of purposes and for recording the operation of almost any machine or device whatsoever which embodies a moving part regardless of the purpose for which such machine or device is used.

It is obvious that various changes in details of construction and arrangement may be made to suit different conditions of use, and the invention, therefore, is not restricted to the precise details of construction and arrangement shown and described and that all such changes are within the scope of the invention provided the means set forth in the following claims be employed.

I claim as my invention:

1. In a registering mechanism the combination of a registering device, an operating shaft, a clutch mechanism between said registering device and shaft, an actuating member operatively connected with said shaft, a lock, means actuated by said lock adapted to hold the actuating member against movement, and separate means simultaneously controlled by said lock to actuate said clutch mechanism.

2. In a registering mechanism the combination of a registering device, a rotatable shaft, a clutch mechanism between said registering device and shaft, an actuating member operatively connected with said shaft, a lock, a sliding bar adapted to hold said actuating member against movement, and a pin secured to the lock and operatively engaging said sliding bar and clutch mechanism.

3. In a registering mechanism the combination with a registering device, of an operating shaft, a clutch between said registering device and shaft, a movable actuating member operatively connected with said shaft, a sliding bar adapted to lock said actuating member against movement, a spring for normally holding said bar in its locking position, a lock, and an arm actuated by said lock, said arm engaging with the sliding bar to move the same against the action of the spring and coöperating with said spring to open and close said clutch.

4. In a registering mechanism, the combination with a registering device, of an operating shaft therefor, a clutch between said registering device and shaft comprising a fixed male member and a movable female member, a clutch spring normally holding said clutch members in engagement, a sleeve operatively connected with the movable clutch member, a movable actuating member operatively connected with said shaft, a locking bar adapted to lock said actuating member against movement, a locking spring normally holding said bar in its locking position, a lock, and means operated by the lock adapted to engage with said bar and positively retract the same against the movement of the locking spring and positively engaging said sleeve to operate the same and permit the clutch spring to operate when the locking bar is retracted.

5. In a registering mechanism the combination of a registering device, an operating shaft, a clutch between said registering device and shaft, a plurality of gears loosely mounted on said shaft, a pawl and ratchet connection between said gears and shaft, whereby the gears automatically rotate said shaft when driven in opposite directions, a driving gear in engagement with both of said driven gears, an actuating member operatively connected with said driving gear for rotating the same, a sliding bar adapted to hold said actuating member against movement, a lock, and means actuated by said lock to disengage said bar and to control said clutch member.

6. In a registering mechanism the combination of a plurality of registering devices, an actuating member operatively connected with said registering devices, a plurality of locks corresponding in number with said registering devices and a locking bar adapted to engage the actuating member and operated by each of said locks independently.

7. In a registering mechanism, a plurality of registering devices, a single operating shaft for actuating each of said registering devices, a clutch mechanism between each of said registering devices and shaft, an actuating member operatively connected with said shaft, a plurality of locks each comprising a barrel corresponding with said registering devices, and means operatively connected to each of said lock barrels controlling the clutch mechanism of the corresponding registering device.

8. In a registering mechanism, a plurality of registering devices, a single operating shaft for said registering devices, a clutch between each of said devices and said shaft, an actuating member operatively connected to said shaft, a plurality of locks, each corresponding to one of said registering devices, a sliding bar adapted to hold the actuating member against movement and a pin secured to each of said locks and actuated thereby, said pins being operatively connected with the sliding bar and with the clutch of the corresponding registering device.

9. In a registering mechanism, a plurality of registering devices, an actuating member operatively connected with each of said registering devices, a plurality of locks, each corresponding with one of said registering devices, and a sliding bar adapted to hold the actuating member against movement and having a plurality of irregular shaped slots therein, means for normally holding said sliding bar in its operative or locking position, and means on each lock seating in one of said slots and adapted to move said bar into its non-operative position.

10. In a registering mechanism, a plurality of registering devices, an operating shaft, a clutch between each of said devices and said shaft, a counter-shaft parallel to said operating shaft, a plurality of sleeves on said parallel shaft, each corresponding with a registering device having an arm operatively connected with one member of said clutch, means for actuating the operating shaft, a plurality of locks, each corresponding with one of said registering devices, and means on each of said locks engaging the clutch operating sleeve of the corresponding registering device.

11. A registering mechanism comprising a hollow support, a casing secured to said support, a registering device in said casing, a rotatable pinion in said casing operatively connected with said registering device, a rack in said support meshing with said pinion, a lock in the casing, and means on the lock for rendering both the registering device and the rack relatively inoperative.

12. In a registering mechanism the combination of a hollow support provided with a base, a casing mounted on and supported by said support above its base, a rod mounted to reciprocate in said support, a locking bar in said casing adapted to engage with the rod to hold same against movement, means for releasing said locking bar, and means in said casing for registering movement of said rod after said locking bar has been released.

13. In mechanism of the class described, in combination, a driving member adapted to move in different directions, a plurality of registering devices actuated by the said driving member, means for locking said driving member against movement, and means operatively connecting either of said registering devices independently of the other to the driving member.

14. The combination with a movable actuating member, of a locking bar adapted to hold said member against movement having an irregular slot provided therein, one side of the slot forming a bearing surface, a spring normally holding the bar in its locking position, a guide flange secured to and movable with said locking bar, a lock, means on said lock engaging said bearing surface to retract the bar and hold same retracted against the tension of the spring, and a guard piece on said lock adapted to engage the guide flange when the bar is in its retracted position.

This specification signed and witnessed this 31st day of January, A. D., 1911.

LOUIS RANDOLPH COLE.

Signed in the presence of—
N. A. SMITH,
AMBROSE L. O'SHEA.